Dec. 12, 1950     E. J. GREENWOOD     2,534,168
CONTROL FOR AIRCRAFT DRIVES
Filed March 1, 1946     3 Sheets-Sheet 2

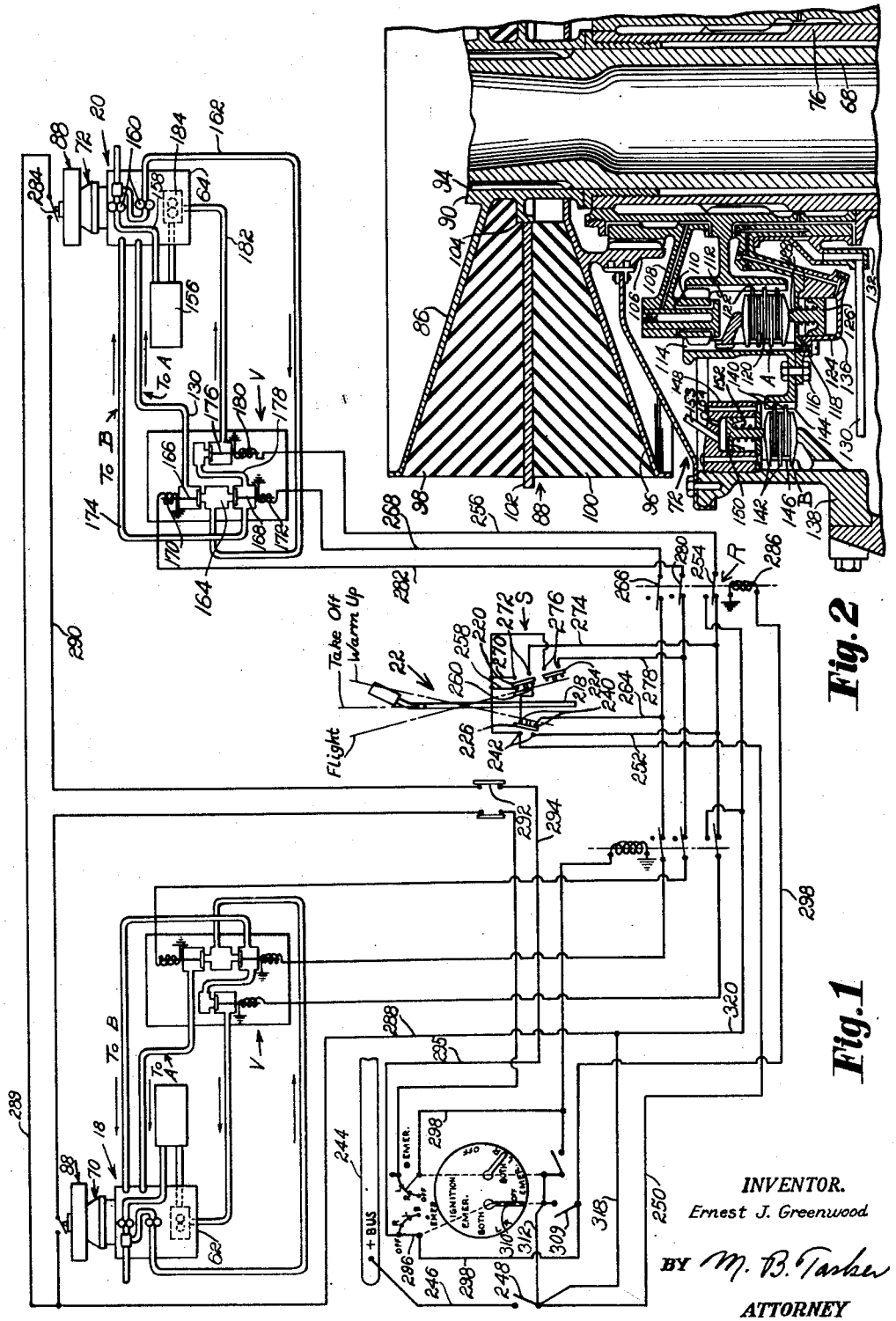

INVENTOR.
Ernest J. Greenwood
BY
*M. B. Tasker*
ATTORNEY

Dec. 12, 1950     E. J. GREENWOOD     2,534,168
CONTROL FOR AIRCRAFT DRIVES
Filed March 1, 1946     3 Sheets-Sheet 3

INVENTOR.
Ernest J. Greenwood
BY M. B. Tasker
ATTORNEY

Patented Dec. 12, 1950

2,534,168

UNITED STATES PATENT OFFICE 2,534,168

CONTROL FOR AIRCRAFT DRIVES

Ernest J. Greenwood, Stratford, Conn., assignor to United Aircraft Corporation, East Hartford, Conn., a corporation of Delaware Application March 1, 1946, Serial No. 651,266

12 Claims. (Cl. 60—97)

This invention relates to the control of aircraft drives and particularly to the control of aircraft engines and change-gear transmissions.

It is an object of the invention to provide combined control means for the throttle of an aircraft engine and the change-gears of its associated transmission by which both the throttle and the change-gears are under the control of a single pilot operated member.

Another object of the invention is to provide a combined throttle and change-gear control mechanism in which the control member can be moved to control the change-gears only in predetermined positions of the engine throttle.

A further object of the invention is to provide control means of the above type for aircraft having a plurality of engine-transmission units by which all of the engine throttles and the change-gear mechanisms of the several units can be operated by the pilot in unison and by which the throttle of any selected engine may be separately operated.

A still further object of the invention is to provide a combined control system of the type above outlined having improved means for manually connecting and disconnecting an engine in flight.

A yet further object of the invention is to provide a control system of this types having provision for automatically disconnecting a faulty engine and in which means are also provided for preventing the automatic disconnection of an engine in a predetermined range of throttle positions.

These and other objects and advantages of the invention will be apparent from the following description of a preferred embodiment of the invention illustrated in the accompanying drawings.

In these drawings:

Fig. 1 is a diagrammatic view illustrating two engine-transmission units and the control system therefor;

Fig. 2 is a sectional view through the change-gear mechanism of one of the transmissions;

Figure 6:
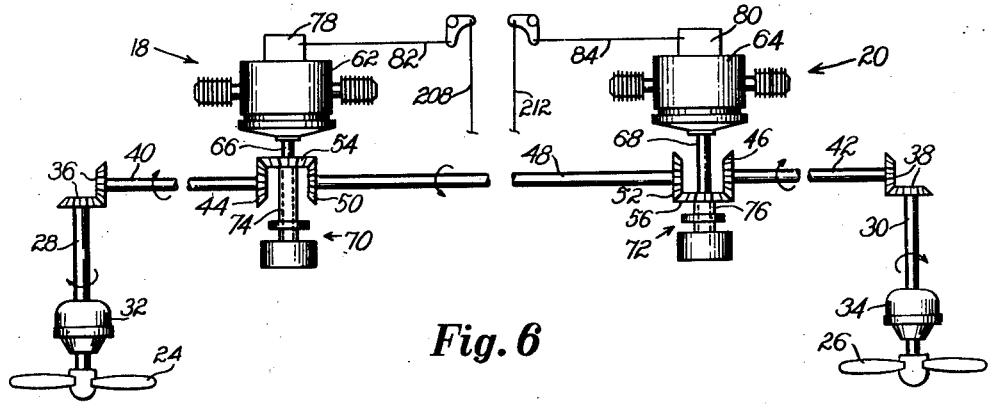
Fig. 6 is a diagrammatic view showing the engine-transmission units and the propeller system connected thereto.

As herein shown, the invention is embodied in an all-wing airplane 10 having a pilot compartment 12 centrally located in the forward part of the wing between two engine nacelles 14 and 16 in which engine-transmission units 18 and 20 are provided (Fig. 6). Manual control mechanism, generally indicated at 22, is located in compartment 12 convenient to the pilot for controlling both engine-transmission units in an improved manner as will hereinafter appear.

The airplane is propelled by two oppositely rotated propellers 24, 26 (Fig. 6) having fore and aft directed propeller driving shafts 28, 30 and usual reduction gearing 32, 34. Propeller shafts 28, 30 are connected by bevel gears 36, 38 to transverse shafts 40, 42 which carry bevel gears 44, 46 at their inboard ends. The two propeller drives above described are connected by a transverse shaft 48 carrying bevel gears 50, 52 at its opposite ends in confronting relation to gears 44, 46 and by bevel gears 54, 56 which mesh respectively with the pairs of confronting bevel gears 44, 50 and gears 46, 52 referred to above.

It will be noted that gear 54 is located aft and gear 56 is located forward of the pairs of meshing gears so that the gears 54, 56 which are driving gears can be driven by like rotating engine-transmission units.

The engine-transmission units 18, 20, shown diagrammatically in Fig. 6, comprise like rotating engines 62, 64 of the radial cylinder, air-cooled type having power output shafts 66, 68 and coaxial transmissions 70, 72 the output shafts 74, 76 of which drive the bevel gears 54, 56 of the propeller drive system. The engines 62, 64 have carburetors 78, 80 provided with the usual throttles (not shown) having throttle operating connections 82, 84. The transmission mechanisms 70, 72 are identical in construction and accordingly only transmissions 72 will be described.

The power output shaft 68 of engine 64 carries at its forward end an outwardly and forwardly flared metal flange 86 of a flexible coupling 88 which has a hub 90 integral with flange 86 and connected to shaft 68 by splines 94. The flange 86 is connected to a similar but outwardly and rearwardly flared metal flange 96 by resilient bodies of rubber 98, 100 which are bonded to the respective flanges and to an intermediate plate 102 freely supported on an outstanding flange 104 integral with hub 90. The flange 96 supported by the rubber body 100 is free to rotate relative to hub 90 within the limits of the wind-up of coupling 88. Flange 96 is provided with a rearwardly directed annular flange 106 which is operatively connected to and drives change speed gearing which will be next described.

The flange 106 is splined to a planetary pinion carrier 108 which carries a plurality of planetary pinions 110 which mesh with a sun gear 112 keyed to output shaft 76. Pinions 110 also mesh with an internal ring gear 114 which is secured by a series of peripherally arranged bolts 116 to an intermediate gear member 118 rotatably supported on shaft 76. The teeth of the sun gear 112 and of the ring gear 114 are elongated and provide an annular chamber therebetween for the accommodation of a clutch A consisting of alternate sets of ring shaped plates 120, 122 provided with teeth on their respective outer and inner peripheries meshing with teeth on the ring and sun gears 114 and 112 respectively.

The plates of clutch A are moved into engagement to connect the sun and ring gears for bodily rotation by hydraulic means carried by intermediate member 118 and including an annular cylinder 124 containing an annular piston 126, the latter having a plurality of peripherally spaced piston rods 128 which engage the rearmost clutch plate. Fluid is supplied through a conduit 130 to a stationary manifold 132 which communicates through suitably interconnecting passages in the intermediate member 118 with the interior of cylinder 124. Piston 126 is constantly biased by springs surrounding piston rods 128 into a position to disengage the clutch, suitable vents 136 being provided in the periphery of cylinder 124 to permit the restricted flow of fluid from the cylinder to effect disengagement of the clutch under the bias of the springs whenever the supply of fluid to conduit 130 is cut off, it being understood that the flow capacity of all the vents 136 is less than the capacity of conduit 130 to supply fluid to the clutch.

Means are also provided for releasably connecting the ring gear 114 to the casing 138 of the transmission including a brake B having alternately arranged ring shaped plates 140, 142 which are peripherally connected respectively to the external teeth 144 and the internal teeth 146 on ring gear 114 and casing 138 respectively. A casing supported annular cylinder 148 containing an annular piston 150, both similar to the cylinder 124 and piston 126 of clutch A previously described, are provided for moving the brake plates into engagement against the bias of brake disengaging springs 152, a fluid conduit 153 being provided for admission of fluid to the cylinder. Restricted vents 154 may also be provided if desired for the slow escape of fluid from the cylinder, although other means are provided for draining the brake cylinder as will subsequently appear.

Fluid under pressure is supplied to clutch A or brake B to provide different drive ratios. If fluid is supplied to clutch A only, the planetary pinions 110 rotate bodily with the sun and ring gears 112 and 114 to provide a one-to-one ratio drive, whereas if fluid is supplied only to brake B an overdrive is provided for driving shaft 76 at a higher R. P. M. than shaft 68.

The above transmission is described more fully and is claimed in Patent No. 2,462,824, issued February 22, 1949, to Charles H. Zimmerman and Henry J. Rapuano, and assigned to the assignee of this application.

The hydraulic mechanism for supplying fluid to the transmission is best shown in Fig. 1 wherein a combined hydraulic and electrical diagram of the control system for the engine-transmission units is shown. It will be noted that each engine-transmission unit 18 and 20 has an electrically actuated hydraulic valve mechanism V associated therewith for supplying fluid to the clutch A and the brake B. A combined manually operable throttle and selector switch mechanism S common to both engine-transmission units is also provided for controlling the electric circuits of the valve mechanisms V. The hydraulic valve mechanisms V associated with the engine-transmission units are identical and that associated with unit 20 will now be described.

An oil reservoir 156 is provided from which oil is supplied through a pipe 158 to oil pumps 160 which are driven by the engine and which force oil or other fluid under pressure through the pipe 162 to a pressure chamber 164 that is common to two electrically operated valves 166 and 168. The valve 166 when opened by energizing its solenoid 170 supplies fluid under pressure from chamber 164 through conduit 130 to cylinder 124 of clutch A previously described. Similarly the valve 168 upon energization of its solenoid 172 supplies fluid under pressure from the chamber 164 through conduit 174 to cylinder 148 of brake B previously described. A third electrically operated valve 176 is provided having a connection through conduit 178 to valve 168 and conduit 174 which is adapted when its solenoid 180 is energized to drain the cylinder 148 of clutch B through conduit 182 to a sump 184 in the engine casing from which it is pumped into the reservoir 156.

Figure 3:
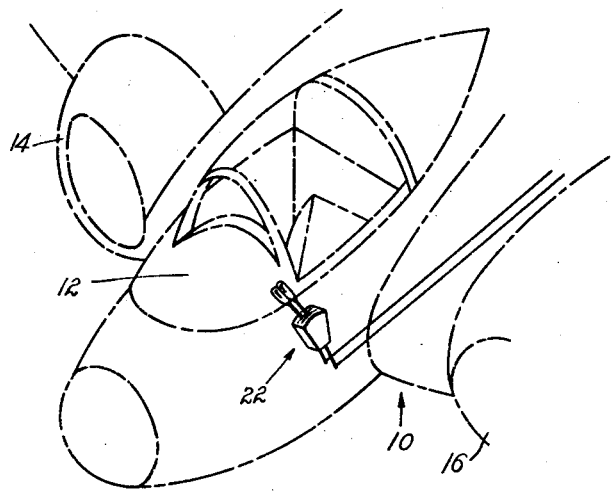
Fig. 3 is a phantom view of a portion of an airplane showing the location of the manual control mechanism for the throttles and change-gear mechanisms.
Figure 4:
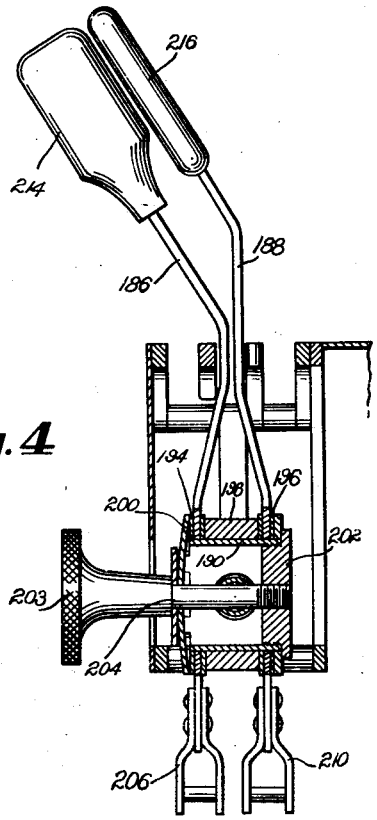
Fig. 4 is a vertical sectional view through the control mechanism.
Figure 5:
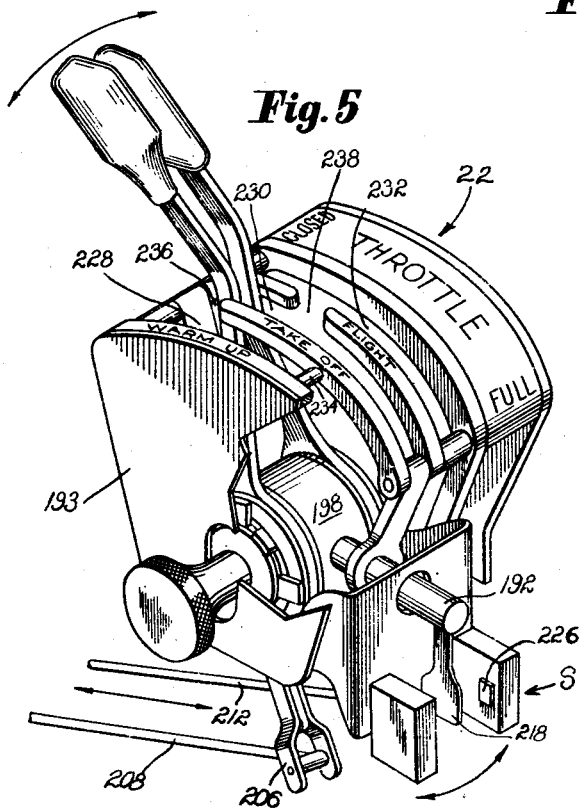
Fig. 5 is a perspective view of the control mechanism.

As shown in Figs. 4 and 5, the manual control mechanism 22, which is common to both engine-transmission units 18 and 20, comprises a manual throttle lever 186 for controlling the throttle of engine 62 and a manual throttle lever 188 for controlling the throttle of engine 64 both of which are pivoted in side by side relationship on a sleeve 190. The sleeve 190 is supported for rotation about an axis perpendicular to its longitudinal axis and to this end it carries a pair of aligned axial pins, one of which is shown at 192 in Fig. 5, which are journalled in a housing and supporting structure 193. The levers 186 and 188 have circular hubs 194 and 196 which are spaced apart by a tubular member 198, the levers being frictionally restrained against pivotal movement about the sleeve 190 by suitable friction washers under the action of a plate spring 200 acting against an abutment 202 carried by sleeve 190. An axial adjusting screw 203 having a shoulder 204 is screw-threaded into the abutment 202 and engages the spring beneath its shoulder 204 to provide adjustable restraint for the pivotal movement of levers 186 and 188. The lever 186 carries a clevis 206 at its free end in which a rod 208 is pivoted, this rod extending aft in the cockpit and being connected to the throttle linkage 82 of engine 62. Lever 188 has a similar clevis 210 which is connected by a rod 212 to the throttle linkage 84 of the engine 64.

The throttle levers 186 and 188 have hand grips 214 and 216 respectively which move in closely adjacent parallel planes so that when desired the throttles of both engines 62 and 64 can be controlled in unison by grasping both grips 214 and 216 and moving them as a single grip. Obviously, since they are separately movable about their pivotal support 190, either lever may be moved about its pivot to control its connected engine throttle independently of the other. The transverse axial pin 192 carries a depending switch operating arm 218 which is adapted to operate the selector switch mechanism S upon pivotal movement of levers 186 and 188 about the transverse axis including pin 192. Movement of the throttle levers to the left, as viewed in Fig. 1, causes the switch operating arm, or paddle, 218 to swing to the right into position to engage and operate a double throw switch 220 and a single throw switch 224, whereas movement of throttle levers to the right causes the switch operating arm 218 to move to the left and operate a double throw switch 226.

Means are provided on the top wall of casing 193 to restrict the combined movements of the throttle levers 186 and 188 about their transverse axis between three parallel planes of movement, or grooves, 228, 230, 232, in any of which they can jointly or severally control their respective engine throttles. In the left hand groove 228, which is the engine warm-up groove, the throttles can move between closed throttle position and an abutment 234 in approximately mid-throttle position. The throttle levers can be moved from the warm-up groove into the middle, or take-off groove 230 through a transverse gap 236 only in the closed throttle position thereof, and they can be moved from the take-off groove 230 through the gap 238 into the flight groove 232 only in a predetermined low throttle setting thereof. Tracing the circuits for the solenoid valves 166, 168 and 176 of engine-transmission unit 20 in the different positions of the throttle levers (Fig. 1) will clearly explain the operation of the system.

Assuming that the two throttle levers 186 and 188 are in the warm-up groove 228, it will be evident that these levers can be moved either jointly or severally between the closed throttle position thereof and a mid-throttle position in which they engage the stop 234. With the throttle levers in this groove, in which they occupy the angular position represented in Fig. 1 by the dot and dash line marked "warm-up," switches 220 and 224 occupy their normal positions indicated in this figure while switch 226 is engaged by the paddle 218 and is moved from its normal position in which it bridges contacts 240 into position to bridge contacts 242. This completes the circuit from the bus bar 244 through conductor 246, normally closed manual switch 248, conductor 250, contacts 242, conductor 252, switch 254 of relay R and conductor 256 to the solenoid winding 180 of selector valve 176, causing this valve to open and drain the cylinder 148 of brake B through conduits 174, 178 and 182 to the engine sump. It will be noted that in this position of the throttles, selector valves 170 and 172 which control the admission of fluid to clutch A and brake B respectively from pressure chamber 164 remain closed. Accordingly, neither engine is connected to the propeller system.

By moving the throttle levers through gap 236 into groove 230 the transmissions 70, 72 connect their respective engines to the propeller system in the overdrive, or high propeller speed, ratio which is required in the low airplane speeds prevailing in take-off. This is the take-off position of the throttle levers shown diagrammatically in Fig. 1 in which the paddle 218 is in a mid-position and out of operative engagement with all three of the switches. Switch 226 is now bridging contacts 240, which is its normal position, and current from the bus bar passes through conductors 246, 250, 258 normally closed contacts 260 of switch 220, contacts 240 of switch 226, conductor 264, switch 266 of relay R and conductor 268 to solenoid 172, causing selector valve 168 to open and admit fluid from pressure chamber 164 through conduit 174 to cylinder 148 of brake B. It will be noted that in this position of the throttle levers the selector valves 166 and 176 remain closed. While in this groove the throttles can be jointly moved throughout the entire throttle range to control both engines in unison to obtain the full take-off power available. It will be noted, however, that in order to move the throttle levers back into the warm-up groove, in which the engines are both disconnected, it is necessary to completely throttle both engines.

By moving both throttle levers into a partially open throttle position opposite the gap 238, they can be moved into the cruise, or flight, groove 232 in which, in the illustrated embodiment, a one to one speed ratio is provided between engine driven shafts 66 and 68 and propeller driving shafts 74 and 76, thus affording a lower range of propeller R. P. M. which is desirable for normal flight conditions. With the throttle in the flight groove, current from the bus bar 244 flows through conductors 246, 250 and 270, contacts 272 of switch 220, which are now closed, conductor 274, switch 254 of relay R and conductor 256, energizing the solenoid winding 180 of selector valve 176 which drains the cylinder 148 of brake B as previously described. A circuit is also completed from conductor 250 through contacts 276 of switch 224 through conductor 278, switch 280 of relay R and conductor 282 to energize winding 170 of selector valve 166 which admits fluid from pressure chamber 164 through conduit 130 to clutch A. Thus, in this position of the throttle levers, fluid is supplied to the clutch A through open selector valve 166 while selector valve 168 remains closed and selector valve 176 is open to drain brake B.

Figure 9:
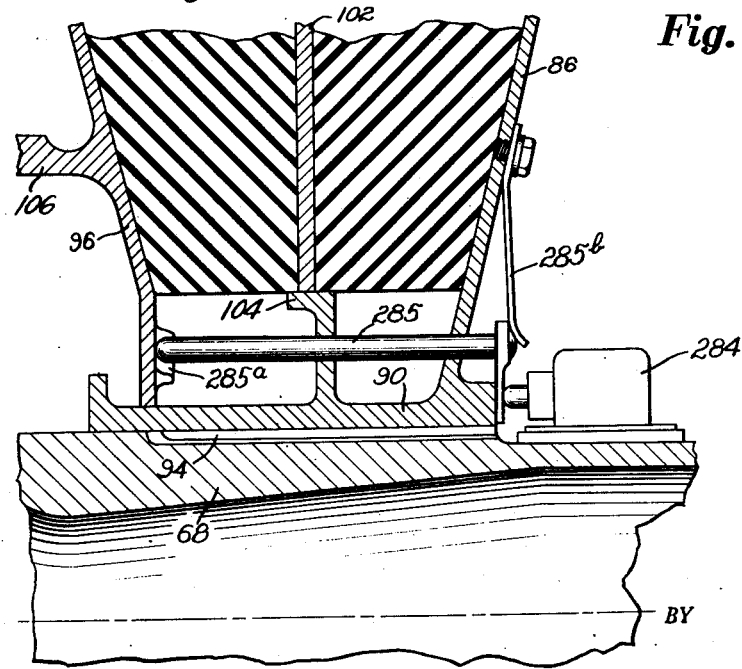
Fig. 9 is a detail of the operating means for the switch by which a faulty engine is disconnected from the system.

Each of the engine transmission units 18 and 20 has means, which are identical, for automatically disconnecting its engine from the interconnected propellers upon a predetermined decrease in torque developed by the engine which means are operative under some conditions of engine operation. Automatic disconnection of engine 64, for example is effected by the closing of a normally open switch 284 associated with the transmission 72. The switch 284 is closed automatically upon a change in the wind-up of the rubber coupling 88. It will be evident that when shaft 68 is under torque created by engine 64 and is furnishing power to the engine propeller system through the transmission 72, including the coupling 88, that this coupling will have a wind-up due to the resilience of the rubber blocks 98, 100 in proportion to the torque developed by the engine. However, if the engine 64 fails, the power transmitted through the coupling will be reversed, i. e. shaft 68 will become a driven shaft and shaft 76 will become the driving shaft. This reversal of wind-up in the coupling is utilized to close the switch 284 by switch actuating mechanism shown in Fig. 9 wherein the switch 284 is shown as mounted on the forward end of engine driven shaft 68 in position to be actuated upon the forward movement of a switch actuating pin 285 which is longitudinally slidably mounted in hub 90. Pin 285 is actuated upon reversal of torque, or upon a predetermined decrease in torque in shaft 68, by a cam face 285a on flange 96 against which the aft end of pin 285 is urged by a leaf spring 285b carried by flange 86, it being evident that upon a predetermined decrease in torque exerted on flange 86 by shaft 68, pin 285 will ride up the inclined cam face 285a with the result that it will be cammed forward and will close switch 284.

Referring to Fig. 1, it will be evident that closing of the switch 284 associated with transmission 72 will complete a circuit from bus bar 244 through conductor 246, switch 248, conductors 318, 288 and 289, switch 284, conductor 290, normally closed switch 292, conductor 294, conductor 295, normally closed switch 296, conductors 298 and winding 286 of relay R. The result of energizing winding 286 of relay R is to open switches 266 and 280 controlling the circuits to selector valves 168 and 166 respectively. Double throw switch 254 of relay R opens the previously described circuit to solenoid winding 180 of valve 176, but closes a second circuit from bus bar 244 through conductor 246, switch 248, conductors 318, 320, switch 254 and conductor 256 to the winding 180. Thus opening of relay R results in energizing valve 176 and draining of the cylinder 148 of brake B.

It is necessary, however, to place some reservations on the automatic disconnection of a faulty engine by the closing of switch 284. In a condition of airplane dive, wherein there is likely to be an engine lag manifesting itself as an actual reversal of torque, it is undesirable to have the switch 284 disconnect engine 64, which might occur if some provision were not made for controlling the circuit above traced for the winding 286 of relay R.

Figure 7:
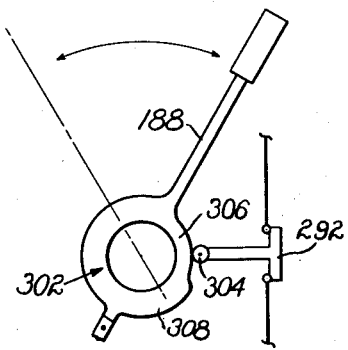
Figs. 7 and 8 are detailed views showing a throttle controlled cam mechanism for operating certain switches of the control system.
Figure 8:
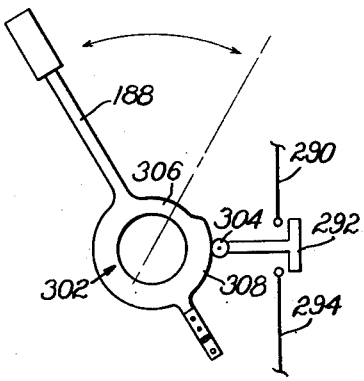

To this end, the normally closed switch 292 is included in the circuit controlled by switch 284, and this switch 292 is placed under the control of the throttle lever 188 so that it is opened whenever the throttle lever is in approximately half closed throttle position or less. This is accomplished by means of a cam 302 (Figs. 7 and 8) which is rotatable with the throttle lever 188 about the axis of sleeve 190, and a cam follower 304 carried by the switch operating member for switch 292. The cam 302 has an arcuate dwell portion 306 over which the cam follower 304 rides during the movement of the throttle lever between full open throttle and approximately half open throttle and an adjacent arcuate dwell portion 308 struck about a larger radius over which the follower moves between approximately half throttle and closed throttle positions of the throttle lever. It will be evident that when the cam follower is on cam portion 308 that the switch 292 will be held open, under which condition closing of switch 284 will have no effect on relay R, making it impossible in half throttle position or less for engine 64 to become automatically disconnected. It will be understood that a similar switch controlled by lever 186 is provided in the circuit of the switch controlling the disconnection of engine 62. The provision of the switch 292 in the circuit also permits idling of the engines when the airplane is on the ground with the transmission in either the take-off or cruise position as determined by the lateral position of the throttle control levers.

It will be evident that following the disconnection of the engine by the closing of switch 284 the engine can be reconnected to the system by merely moving the throttle for that engine to one-half throttle position or less to open switch 292, thus de-energizing the winding 286 of the relay R.

In the event that the pilot wishes to manually disconnect an engine, for example, a burning engine, a normally open switch 309 is provided on the instrument panel adjacent the ignition switch 310 which establishes a circuit from bus bar 244 through conductor 246, switch 248, conductor 312, switch 309 and conductor 298 to winding 286 of relay R.

It is also possible to re-engage a disconnected engine while in flight by opening the normally closed, manual switch 296, previously mentioned, which is included in the circuit of switches 284, 292 and relay winding 286. By moving the throttle lever 188 to a position above one-half throttle position to close switch 292 and moving switch 296 to the emergency position indicated, the circuit to winding 286 of relay R will be opened to cause this relay to assume its normal position as indicated in Fig. 1.

The engine-transmission unit 18 is provided with similar selector valves V having parallel circuits for the control thereof by the selector switches S identical with those above described for unit 20. Accordingly, further description of this unit is believed unnecessary except to emphasize that the like circuits of the two units 18 and 20 are controlled simultaneously by the single manual control means 22.

It will be evident that as a result of this invention it is made possible to control a plurality of engine-transmission units in unison when desired by a combined pilot operated control means for both the engine throttles and the transmission mechanisms. It will also be evident that a control system of the above type has been provided by which the throttle of each engine can be separately controlled if desired.

It will further be evident that means has been provided for the disconnection of either engine and for the reconnection of a disconnected engine by the pilot, while the interconnected propeller system is driven by the other engine. Further, the above improvements have been provided in a particularly simple and efficient control mechanism.

While only one embodiment of the invention has been described in complete detail herein for purposes of illustration, it will be evident that many changes may be made in the construction and arrangement of the mechanism and the electrical and hydraulic connections without departing from the scope of the invention as defined in the appended claims.

What is claimed as new and patentable is:

1. In an aircraft having a propeller, two engines, each having a throttle, transmission means for connecting each engine to the propeller, each transmission means having operating means, and control mechanism including a manually movable member for each engine-transmission unit having operative connections to the transmission operating means and to the throttle of its engine, said control members being mounted for joint movement in one direction to effect the simultaneous operation of said operating means of both transmissions and movable jointly or severally in another direction to effect the joint or several operation of said engine throttles.

2. In an aircraft having a propeller, two engines, each having a throttle, transmission means between each engine and the propeller, each transmission means having change-gear mechanism operable to produce high speed and low speed ratio propeller drives and a neutral in which its engine is disconnected from the propeller and having means for operating said mechanism, and control mechanism including a manually movable control member for each engine-transmission unit having operative connections to the operating means of the change-gear mechanism and to the throttle of its engine, said control members being mounted for joint movement in one direction into high speed, low speed and neutral positions to control simultaneously the operation of said operating means of both transmissions and movable either jointly or severally in another direction, when in any of said three positions, to control said engine throttles.

3. In an aircraft having a propeller, an engine having a throttle, transmission means between said engine and the propeller having mechanism including clutch and brake means operable to produce high speed and low speed ratio propeller drives and a neutral in which the engine is disconnected from the propeller and having hydraulic means for operating said clutch and brake means, and control mechanism for the engine transmission unit including a member movable manually in one direction into high speed, low speed and neutral positions to control the supply of fluid to said hydraulic operating means and movable when in any of said positions in another direction to control the engine throttle.

4. In an aircraft having a propeller, two engines, each having a throttle, transmission means for connecting each engine to the propeller, each transmission means including clutch and brake means operable to produce high speed and low speed ratio propeller drives and a neutral in which its engine is disconnected from the propellers and having hydraulic means for operating said clutch and brake means, and control mechanism for the throttles of both engine-transmission units including a manually movable throttle member for each of said engines, said throttle members being mounted for joint movement in one direction into high speed, low speed and neutral positions to control simultaneously the supply of fluid to the hydraulic operating means of both transmissions and movable either jointly or severally in another direction, when in any of said three positions, to move said engine throttles either jointly or severally.

5. The combination of claim 2 including stop means cooperating with said manually movable control members when said members have been moved in said one direction into said neutral position for limiting the movement of either member in said other direction beyond a predetermined throttle open position.

6. The combination of claim 2 including means for permitting movement of said manually movable control members between said high and low speed ratio positions only when said members have been moved in said other direction into partially closed throttle positions.

7. The combination of claim 2 in which the operating means for the change-gear mechanism is hydraulic and including electrically operated valves for controlling the admission of fluid to said hydraulic operating means, switches governing the energization of the circuits of said valves, and actuating means for said switches controlled by the movement of said manually movable throttle members into said high speed ratio, low speed ratio and neutral positions.

8. In an aircraft having a propeller, two engine-transmission units for driving said propeller, each of said engines having a throttle and each of said transmissions having change-gear mechanism and means for operating the latter, control mechanism common to both units including two manually operable levers each operatively connected to a separate engine throttle, said levers being located in adjacency and permitting said throttles to be operated either jointly or separately when said throttle levers are moved about a common axis, and means for controlling the operating means of both of said change-gear mechanisms simultaneously by movement of said throttle levers in unison about a second axis.

9. In an aircraft having a propeller, an engine having a throttle, a transmission for connecting said engine to the propeller having means for automatically disconnecting said engine from the propeller upon a predetermined decrease in torque developed thereby, a manually operable lever connected to said throttle, and means controlled by said throttle lever for disabling said automatic disconnecting means in predetermined positions of said throttle lever.

10. The combination of claim 8 including means associated with each transmission for automatically operating the change-gear operating means thereof to disconnect its engine from the propeller upon a predetermined decrease in torque developed by its engine, means controlled by the throttle lever of each engine for disabling said automatic disconnecting means in predetermined positions of said throttle lever, in which the operating means for the transmission is hydraulic and is controlled by electrically operated valve mechanism the circuits of which are controlled by movement of said throttle levers about said second axis.

11. In an aircraft having a propeller, two engine-transmission units for driving said propeller, each engine having a throttle and each transmission having change-gear mechanism and hydraulic means for operating the latter, electrically operated valve means for each unit controlling said hydraulic operating means, control mechanism common to both units including two manually operable throttle levers each operatively connected to an engine throttle for operating the latter either jointly or separately when moved about a common axis and switch means for controlling the operation of the valve means of both units simultaneously by movement of said throttle levers in unison about a second axis.

12. The combination of claim 11 in which manually operable means are provided for controlling the valve means of each unit to disconnect its engine independently of said common control means.

ERNEST J. GREENWOOD.

REFERENCES CITED

The following references are of record in the file of this patent:

UNITED STATES PATENTS

| Number | Name | Date |
| --- | --- | --- |
| 1,397,130 | Lansden | Nov. 15, 1921 |
| 1,454,505 | Christen | May 8, 1923 |
| 1,557,214 | McClane | Oct. 13, 1925 |
| 1,671,479 | McIntyre | May 29, 1928 |
| 1,889,295 | Rosatelli | Nov. 29, 1932 |
| 2,338,404 | Carroll | Jan. 4, 1944 |
| 2,348,022 | Owens | May 2, 1944 |
| 2,374,303 | Osborne | Apr. 24, 1945 |
| 2,380,889 | Waseige | July 31, 1945 |
| 2,406,273 | Waite | Aug. 20, 1946 |

FOREIGN PATENTS

| Number | Country | Date |
| --- | --- | --- |
| 306,788 | Great Britain | Feb. 28, 1929 |